United States Patent
Quinn

(10) Patent No.: US 11,464,366 B2
(45) Date of Patent: Oct. 11, 2022

(54) COFFEE SCOOP SYSTEM AND ACCESSORIES

(71) Applicant: 11TH CELT, LLC, Swan Valley, ID (US)

(72) Inventor: Patrick T. Quinn, Swan Valley, ID (US)

(73) Assignee: 11th Celt, LLC, Swan Valley, ID (US)

( * ) Notice: Subject to any disclaimer, the term of this patent is extended or adjusted under 35 U.S.C. 154(b) by 396 days.

(21) Appl. No.: 16/828,221

(22) Filed: Mar. 24, 2020

(65) Prior Publication Data

US 2020/0305647 A1    Oct. 1, 2020

Related U.S. Application Data

(60) Provisional application No. 62/824,798, filed on Mar. 27, 2019.

(51) Int. Cl.
*A47J 42/50* (2006.01)
*A47J 31/44* (2006.01)

(52) U.S. Cl.
CPC ........... *A47J 42/50* (2013.01); *A47J 31/4403* (2013.01)

(58) Field of Classification Search
CPC ............................. A47J 31/4403; A47J 42/50

USPC .................................................. 141/108, 109
See application file for complete search history.

(56) References Cited

U.S. PATENT DOCUMENTS

| | | | | |
|---|---|---|---|---|
| 4,095,716 A * | 6/1978 | Meany | ................ | B65D 77/245 426/115 |
| 5,482,095 A * | 1/1996 | de Chollet | ........... | B65D 77/245 206/229 |
| 7,156,352 B2 * | 1/2007 | Cudney | ..................... | E06C 7/14 248/211 |
| 2008/0047997 A1 * | 2/2008 | Mayfield | ................ | B25H 3/006 224/904 |

FOREIGN PATENT DOCUMENTS

WO    WO-2019015850 A1 *  1/2019  ......... A45D 40/0075

* cited by examiner

*Primary Examiner* — Jason K Niesz
(74) *Attorney, Agent, or Firm* — Workman Nydegger

(57) ABSTRACT

A coffee scoop system includes a scoop having a handle and a bolt. The system also includes a bolt chamber into which the scoop can be selectively secured. The scoop system also includes accessories, including a tamper accessory and a cleaner accessory that can be removably connected to the bolt of the scoop. The chamber includes connection features configured to allow a user to secure the chamber to a wide variety of surfaces and structures.

20 Claims, 12 Drawing Sheets

COFFEE SCOOP SYSTEM AND ACCESSORIES

CROSS-REFERENCE TO RELATED APPLICATIONS

This application claims prior to and the benefit of U.S. Provisional Patent Application Ser. No. 62/824,798, filed on Mar. 27, 2019 entitled COFFEE SCOOP SYSTEM AND ACCESSORIES, which is incorporated herein in its entirety by reference.

BACKGROUND

1. The Field of the Invention

Implementations of the present disclosure relate generally to coffee brewing tools and accessories. More specifically, the present disclosure relates to bolt action coffee scoops and accessories for coffee brewing.

2. The Relevant Technology

Coffee preparation requires a number of tools and accessories, including coffee scoops, espresso tampers, cleaners and so forth. Currently, coffee drinkers and those who prepare coffee beverages must utilize separate tools and devices during preparation. These tools must be kept, cleaned, and maintained separately and may not be compatible with each other when more than one tool is needed. In addition, users often need to store such tools and accessories in drawers or other traditional spaces that also include other utensils or tools. Accordingly, it is often hard to find coffee tools and accessories within drawers when needed and such tools and accessories are not configured to be stored in other, more convenient locations.

Accordingly, there are a number of disadvantages in the art of coffee brewing tools and accessories that can be addressed.

BRIEF SUMMARY

The present disclosure relates generally to coffee brewing tools and accessories. More specifically, the present disclosure relates to bolt action coffee scoops and accessories for coffee brewing. For example, in one embodiment of the present disclosure, a coffee scoop system includes a scoop having a bolt and a handle. The system also includes a chamber configured to receive the bolt of the scoop for selective securement of the scoop within the chamber.

In one embodiment of the present disclosure, a coffee scoop kit includes a scoop having an arm extending from a bolt. The kit also includes a chamber having a passage through which the bolt can be inserted. The chamber also includes a bolt-action channel into which the arm of the scoop is inserted to removably secure the scoop within the chamber during use.

In one embodiment of the present disclosure, a coffee scoop system includes a scoop and a chamber. The scoop includes a bolt and a handle extending from the bolt. The chamber is configured to receive the bolt of the scoop for selective securement of the scoop within the chamber. The chamber includes a base portion having a passageway extending therethrough and a strap configured to thread through the passageway and form a loop. The strap is configured to secure the chamber to a structure.

Additional features and advantages of exemplary embodiments of the present disclosure will be set forth in the description which follows, and in part will be obvious from the description or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations and/or embodiments thereof which are illustrated in the appended drawings. Understanding that these drawings depict only typical implementations and/or embodiments of the invention and are not therefore to be considered to be limiting of its scope, the invention will be described and explained with additional specificity and detail through the use of the accompanying drawings in which.

DETAILED DESCRIPTION

The present disclosure relates generally to coffee brewing tools and accessories. More specifically, the present disclosure relates to bolt action coffee scoops and systems for coffee brewing. The various embodiments of beverage holders described in the present disclosure solve many of the problems in the art described above. For example, the coffee scoop systems described herein provide adaptable, reconfigurable tools and accessories that can be stored in convenient locations for easy retrieval and use. The various tools and accessories are compatible with one another so that a user does not need to purchase multiple different tools for various coffee preparation functions.

Figure 1:
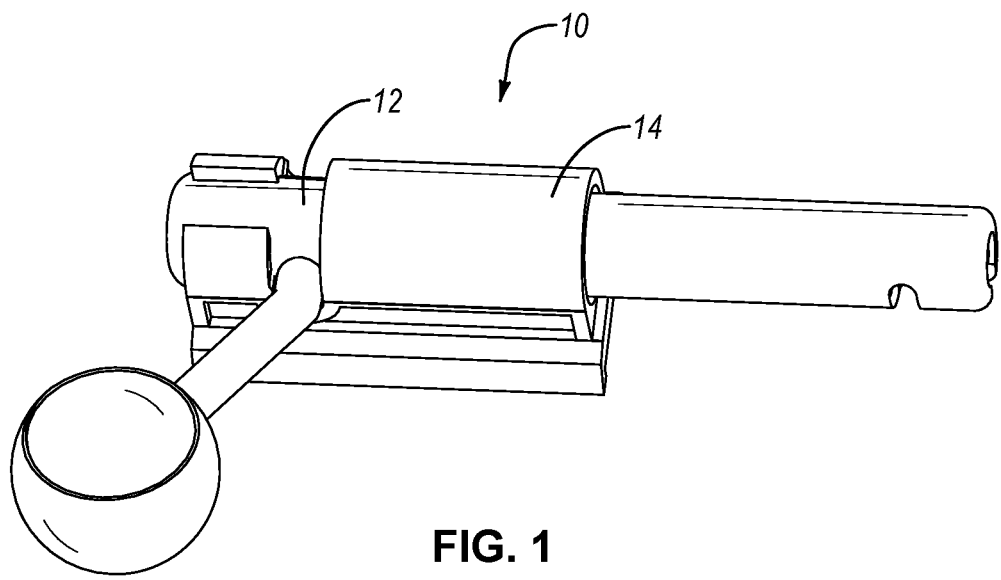
FIG. 1 is a photograph of an embodiment of a coffee scoop system, including a bolt action scoop and a bolt chamber, according to the present disclosure.

For example, FIG. 1 illustrates an embodiment of a bolt action coffee scoop system 10, including a bolt action scoop 12 and a bolt chamber 14. As shown, the bolt action scoop 12 is inserted into the bolt chamber 14 and secured therein. More detail regarding the connection between the scoop 12 and chamber 14 are given hereafter with reference to FIGS. 4A through 4C.

Figure 2A:
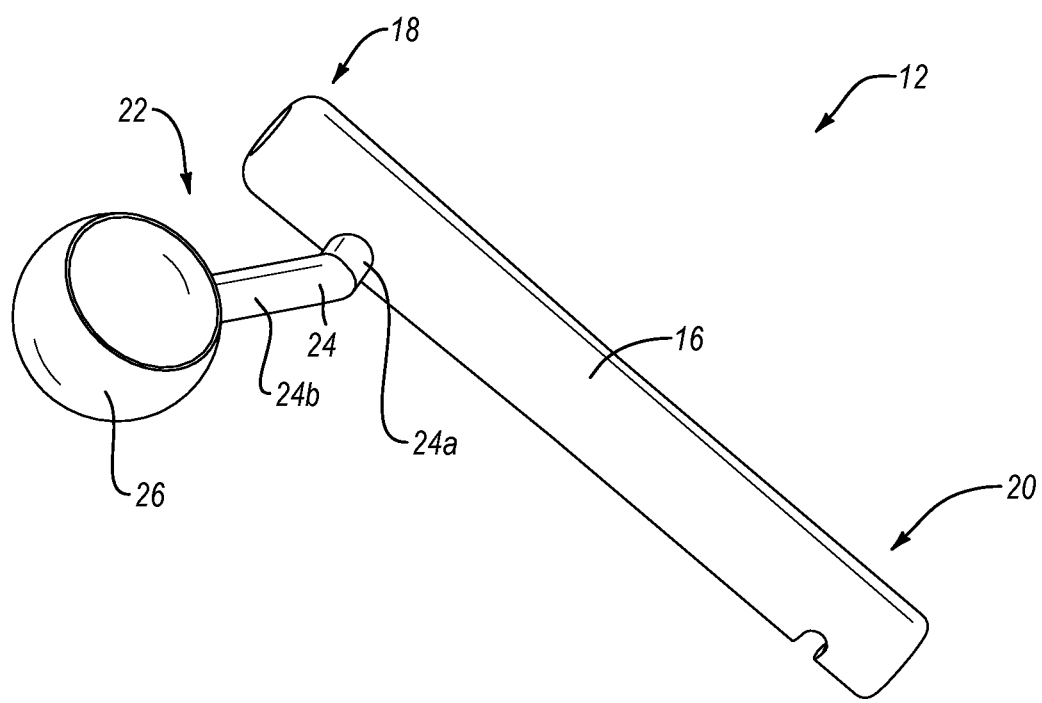
FIG. 2A illustrates a top perspective view of an embodiment of a scoop, according to the present disclosure.

FIG. 2A illustrates a top perspective view of scoop 12 from FIG. 1. The scoop 12 illustrated in FIG. 2A includes a bolt 16 having a first end 18 and a second end 20. A handle 22 extends from the bolt 16 at or near the first end 18 thereof. The handle 22 includes an arm 24 and a spoon 26 disposed at the end of the arm 24. The arm 24 includes a first portion 24a extending perpendicularly out from the bolt 16 and a second portion 24b extending at an angle from the first portion 24a to the spoon 26. The angle at which the second portion 24b extends may vary in one or more other embodiments.

In at least one embodiment, the handle extends from the bolt 16 as shown in FIG. 2A, so that scooping coffee grinds into the spoon 26 is more conveniently performed with the right hand of a user. In such an embodiment, as shown, the spoon 26 may open upward when the handle 22 extends from the bolt 16 to the left. In at least one embodiment, the scoop 12 is configured in a left-handed orientation, where the spoon 26 opens upward when the handle 22 extends from the bolt 16 to the right when held during use.

Figure 2B:
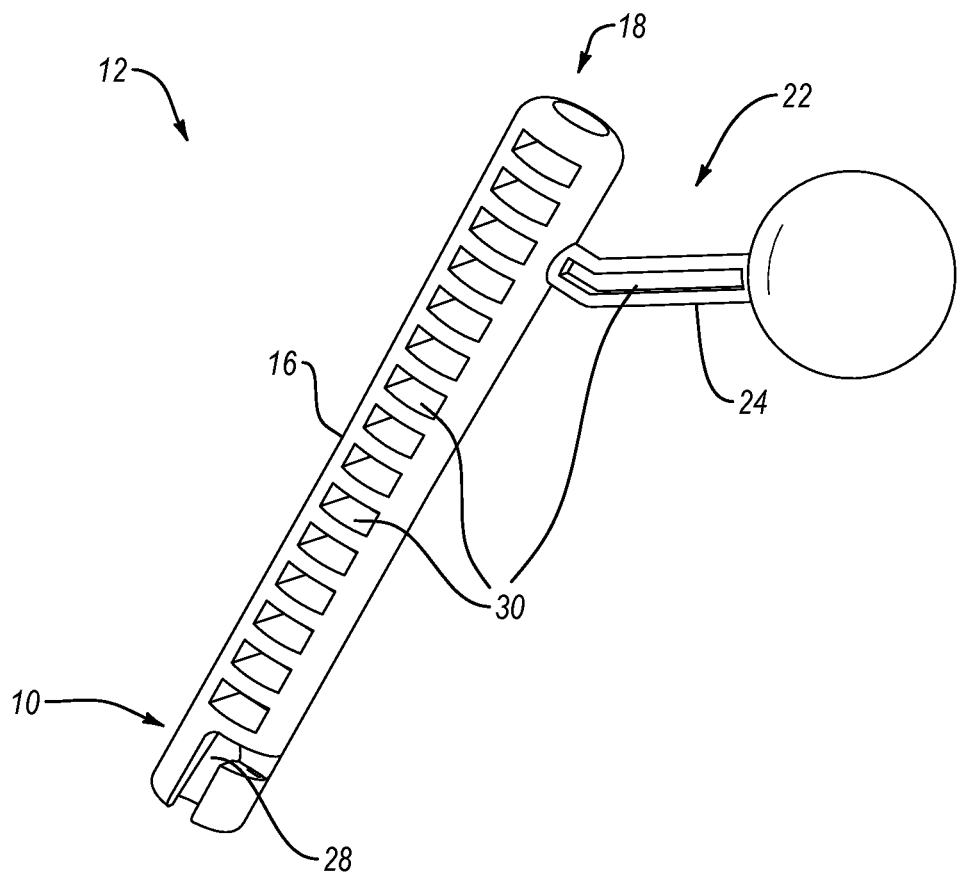
FIG. 2B illustrates a bottom perspective view of an embodiment of a scoop, according to the present disclosure.

FIG. 2B illustrates a bottom perspective view of an embodiment of a scoop 12, including the handle 22 extending from the first end 18 of the bolt 16. As seen in FIG. 2B, the scoop 12 may also include an accessory channel 28 formed in the second end 20 of the bolt 16. The accessory channel 28 is configured to receive and connect the bolt 16 to various coffee preparation accessories. These accessories will be described in more detail below with reference to FIGS. 6 through 10C.

Referring still to FIG. 2B, in at least one embodiment, the bolt 16 includes sections of removed material 30 that may reduce the weight of the scoop 12 and reduce material costs for the manufacturer. In addition, the arm 24 of the handle 22 may also include a portion of removed material to save on weight and costs.

Figure 3A:
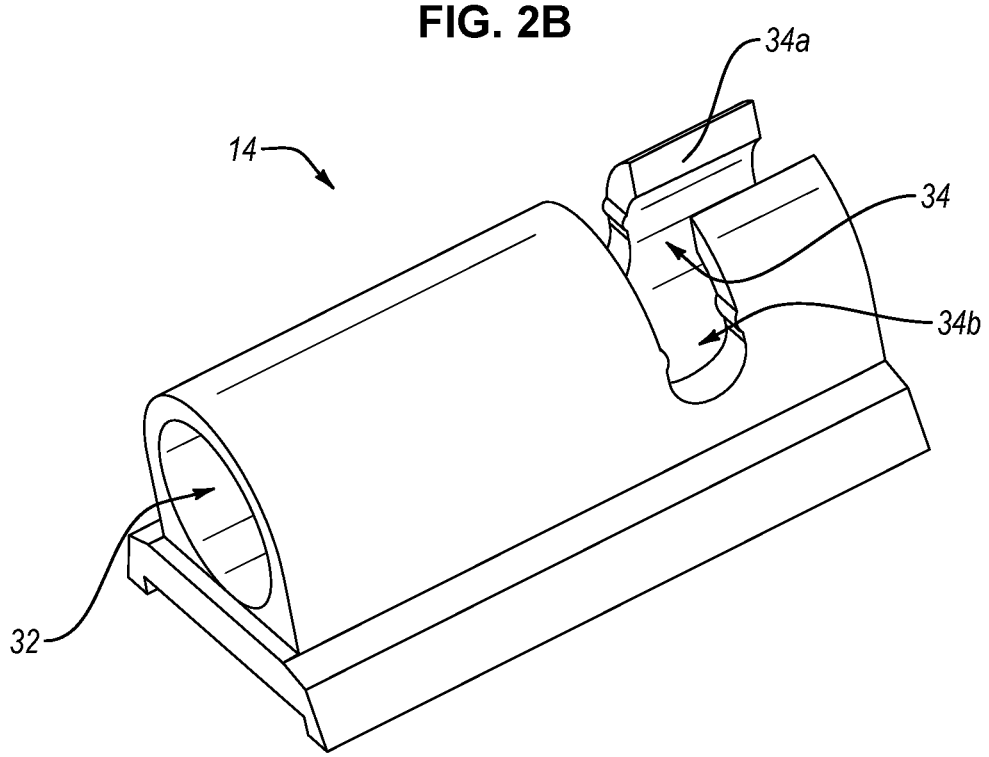
FIG. 3A illustrates a perspective view of an embodiment of a bolt chamber, according to the present disclosure.

FIG. 3A illustrates a perspective view of an embodiment of a chamber 14, similar to the embodiment of the chamber 14 shown in FIG. 1. The chamber 14 includes a passage 32 through which the bolt 16 of the scoop 12 may be disposed. In the illustrated embodiment, the passage 32 extends entirely through the chamber 14 so that the bolt 16 passes all the way through the chamber 14 (e.g., the first and second ends of the bolt 16 extend out of opposing ends of the passage 32). In at least one embodiment, the passage 32 does not pass entirely through the chamber 14, but rather comprises a blind hole configured to receive the bolt 16 of the scoop 12.

In at least one embodiment, the chamber 14 also includes a bolt action channel 34 configured to receive the arm 24 of the handle 22 of the scoop 12. The bolt action channel 34 includes a first channel portion 34a extending longitudinally along a portion of the length of the chamber 14 and a second channel portion 34b extending perpendicular thereto. The first channel portion 34a is open at one end of the chamber to receive the arm 24 of the scoop handle 22. In the illustrated embodiment, the first channel portion 34a terminates at the second channel portion 34b, which extends perpendicularly across the chamber 14 and first channel portion 34a in both directions. In at least one embodiment, the second channel portion 34b extends in only one direction from the first channel portion 34a, either left or right.

Figure 3B:
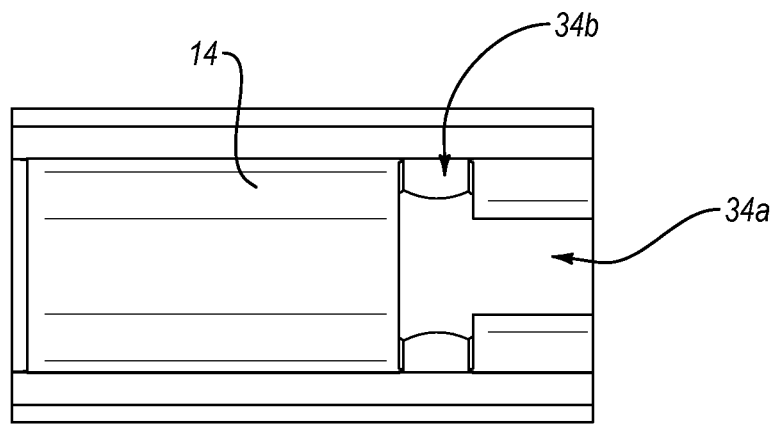
FIG. 3B illustrates a top view of an embodiment of a bolt chamber, according to the present disclosure.

For example, as shown in FIG. 3B, the second channel portion 34b extends both upward and downward from the first channel portion 34a (as oriented in FIG. 3B) to form a T-shaped bolt action channel 34. However, in at least one embodiment, the second channel portion 34b may only extend upward from the first channel portion 34a or may only extend downward from the first channel portion 34a (as oriented in FIG. 3B) to form an L-shaped bolt action channel 34.

Figure 3C:
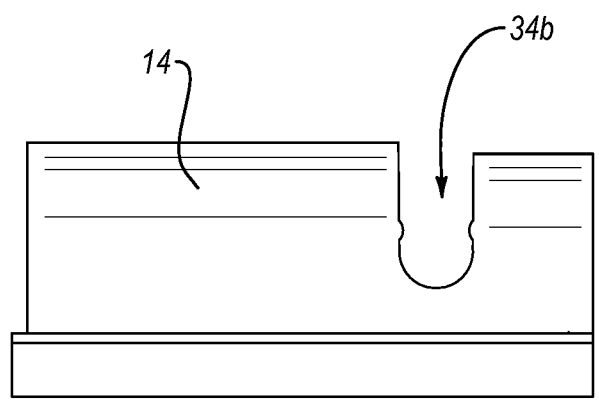
FIG. 3C illustrates a side view of an embodiment of a bolt chamber, according to the present disclosure.

FIG. 3C illustrates a side view of an embodiment of a chamber 14, according to the present disclosure. The side view illustrates the depth of the second channel portion 34b, which only extends partially through the chamber 14 from the top of the chamber 14. The second channel portion 34b forms an opening at the top of the chamber 14.

Figure 4A:
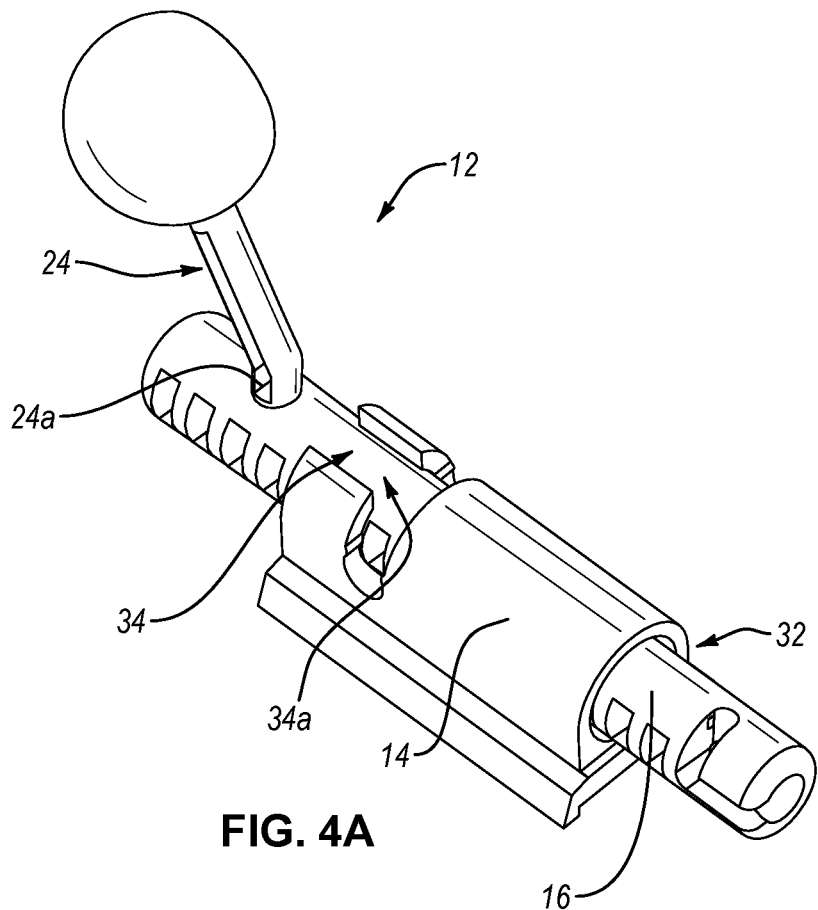
FIG. 4A is a photograph of an embodiment of a scoop being inserted into a bolt chamber, according to the present disclosure.
Figure 4B:
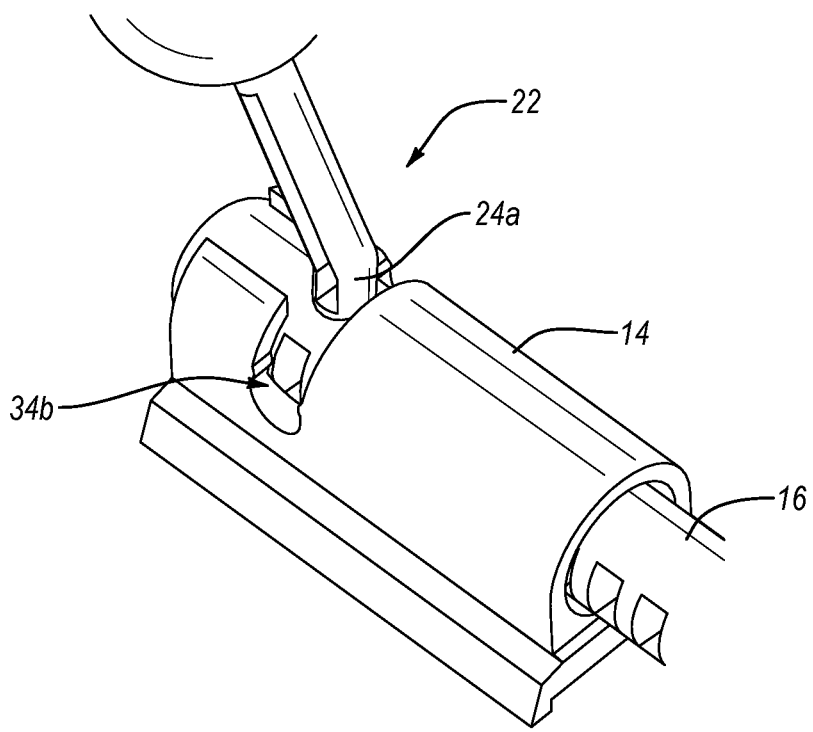
FIG. 4B is a photograph of an embodiment of a scoop partially inserted into a bolt chamber, according to the present disclosure.
Figure 4C:
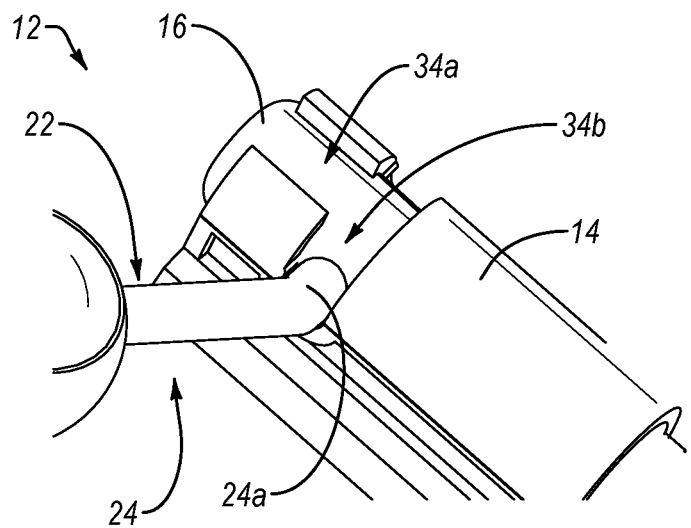
FIG. 4C is a photograph of an embodiment of a scoop inserted into a bolt chamber, according to the present disclosure.

FIGS. 4A-4C illustrate an exemplary scoop 12 being inserted into a chamber 14. As seen in FIG. 4A, the bolt 16 is inserted into and through the passage 32 and the first portion 24a of the arm 24 is aligned with the first channel portion 34a of the bolt action channel 34. To secure the scoop 12 within the chamber 14, a user may then grasp the handle 22 and push the bolt 16 further through the passage 32 until the first portion 24a of the arm 24 extends into the second channel portion 34b of the bolt action channel 34, as seen in FIG. 4B.

Once the first portion 24a of the arm 24 extends into the second channel portion 34b of the bolt action channel 34, the user then rotates the bolt 16 by manipulating the handle 22 sideways until the first portion 24a of the arm 24 turns away from the first channel portion 34a and fully into the second channel portion 34b. In this way, the user can lock the scoop 12 into the chamber 14 so that the scoop 12 does not fall out of the chamber 14, regardless of the orientation of the chamber 14.

The user may grasp the arm 24 of the handle 22 to manipulate the scoop 12 into the chamber 14 as shown. Advantageously, the spoon 26 also provides a convenient feature to grasp while fitting the scoop 12 into the chamber 14. In order to remove the scoop 12 from the chamber 14, the user simply rotates the bolt 16 back so that the first portion 24a of the arm 24 aligns with the first channel portion 34a. Then, the user pulls the bolt 16 out from the passage 32 of the chamber 14.

Figure 5A:
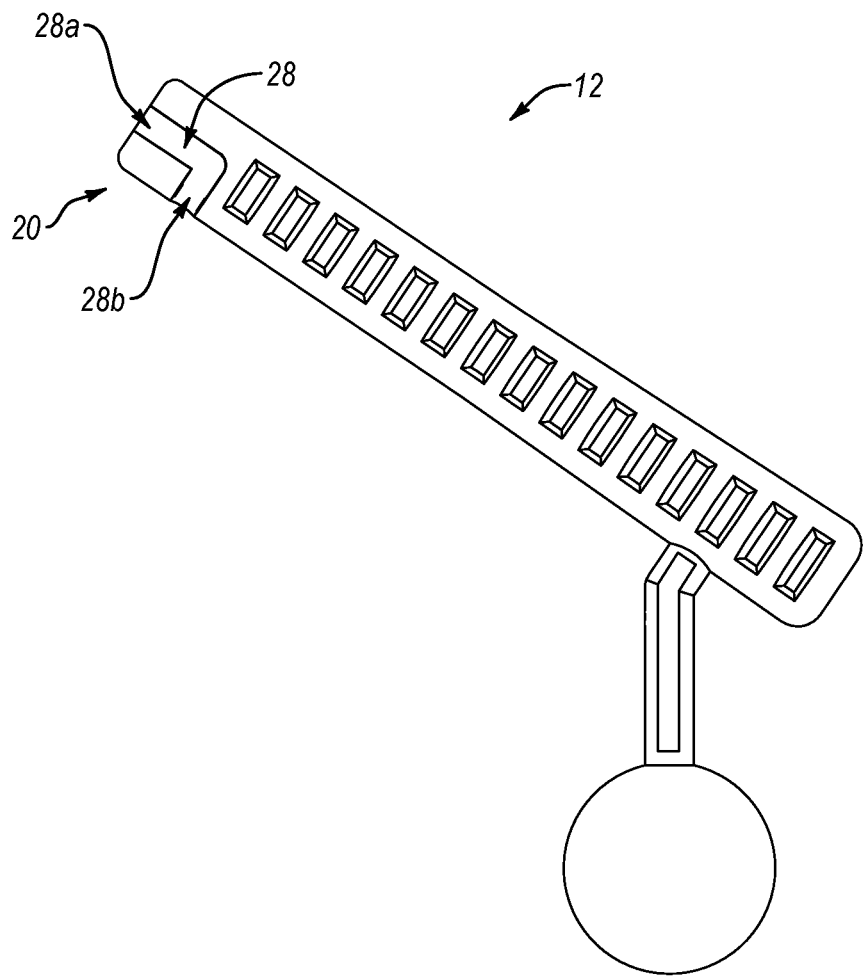
FIG. 5A illustrates a bottom view of a scoop, according to the present disclosure.

FIG. 5A illustrates a bottom view of a scoop 12. As noted above, the scoop 12 includes an accessory channel 28 formed at the second end 20 of the bolt 16. In the illustrated embodiment, the accessory channel 28 forms an L-shaped channel that includes a first channel portion 28a extending longitudinally along a portion of the length of the bolt 16. The first channel portion 28a terminates at a second channel portion 28b, which extends perpendicularly thereto.

Similar to the bolt action channel 34 of the chamber 14 noted above with reference to FIG. 3A, in at least one embodiment, the second channel portion 28b of the accessory channel 28 may also extend both ways from the first channel portion 28a to form a T-shaped accessory channel 28.

Figure 5B:
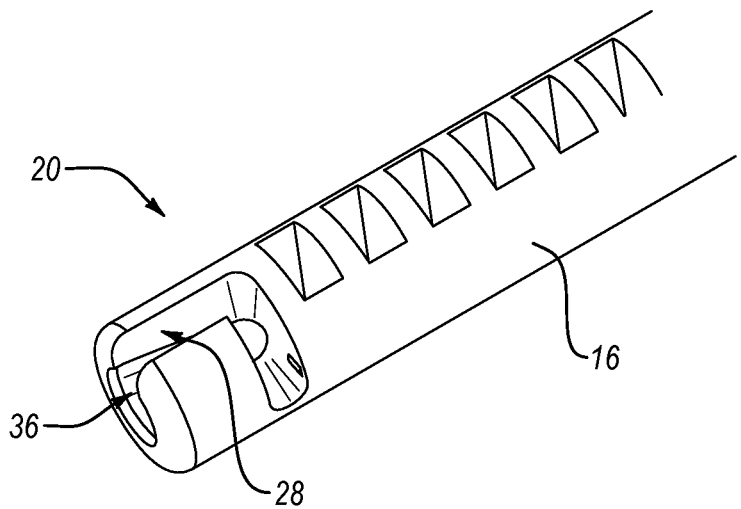
FIG. 5B illustrates a perspective view of one end of the bolt of an embodiment of a scoop, according to the present disclosure

Along these lines, FIG. 5B illustrates a perspective view of the second end 20 of the bolt 16 having an accessory channel 28 formed therein. As shown, the accessory channel 28 forms an opening 36 into which a post from an accessory may be inserted to connect the accessory to the second end 20 of the bolt 16.

Figure 6:
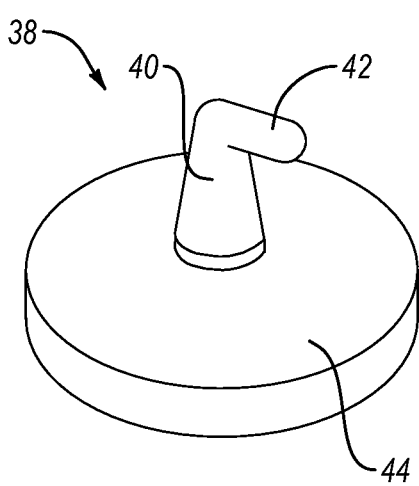
FIG. 6 is a photograph of an embodiment of a tamper accessory, according to the present disclosure.
Figure 7:
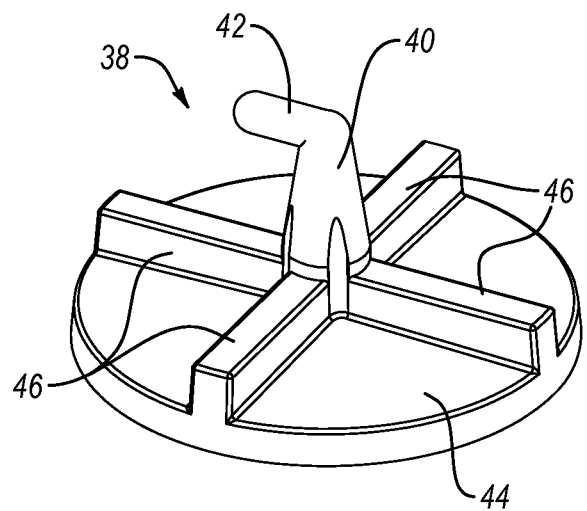
FIG. 7 illustrates an embodiment of a tamper accessory, according to the present disclosure.

For example, FIG. 6 illustrates an embodiment of an espresso tamper accessory 38, which includes a post 40 and post extension 42 to connect the tamper accessory 38 to the bolt 16. The post 40 extends from a circular plate 44 that may be used as an espresso tamper during coffee preparation. Along these lines, FIG. 7 illustrates an embodiment of a tamper accessory 38 that includes various surface features, including radially extending ribs 46 disposed on top of the circular plate 44. The ribs 46 may provide added strength to the tamper accessory 38 during use while allowing the manufacturer to reduce the overall thickness of the circular plate 44 to save on material costs and weight.

Figure 8A:
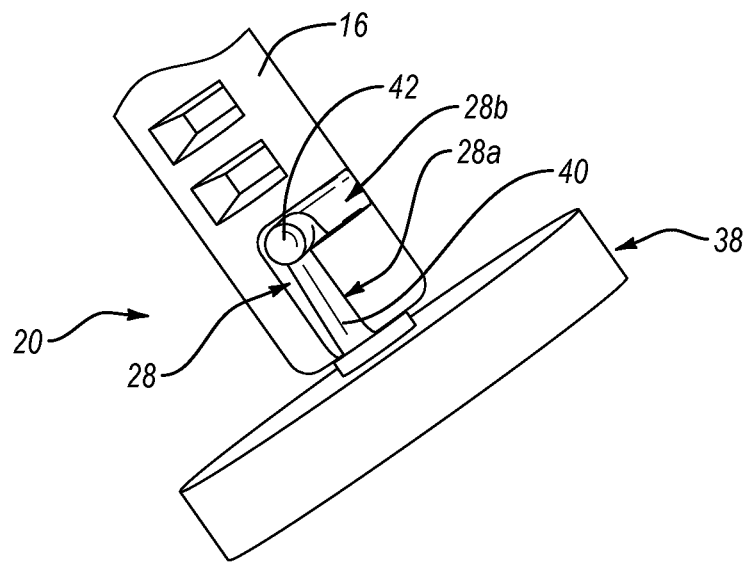
FIG. 8A is a photograph of an embodiment of a tamper accessory connecting to the scoop, according to the present disclosure.
Figure 8B:
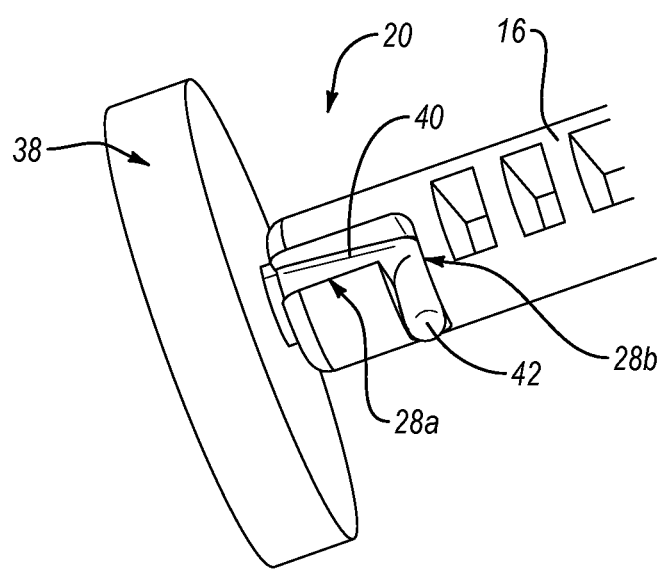
FIG. 8B is a photograph of an embodiment of a tamper accessory connected to the scoop, according to the present disclosure.

FIGS. 8A and 8B illustrate an embodiment of a tamper accessory 38 connecting to the bolt action scoop 12. As shown in FIG. 8A, the post 40 and post extension 42 are inserted into the first channel portion 28a of the accessory channel 28 until the post extension 42 enters the second channel portion 28b. As shown in FIG. 8B, once the post extension 42 is thus inserted, the tamper 38 can be rotated so that the post extension 42 rotates into the second channel portion 28b. In this way, the tamper accessory 38 can be removably secured to the second end 20 of the bolt 16. The tamper accessory 38 will not detach from the bolt 16 unless rotated and pulled out by the user.

Figure 8C:
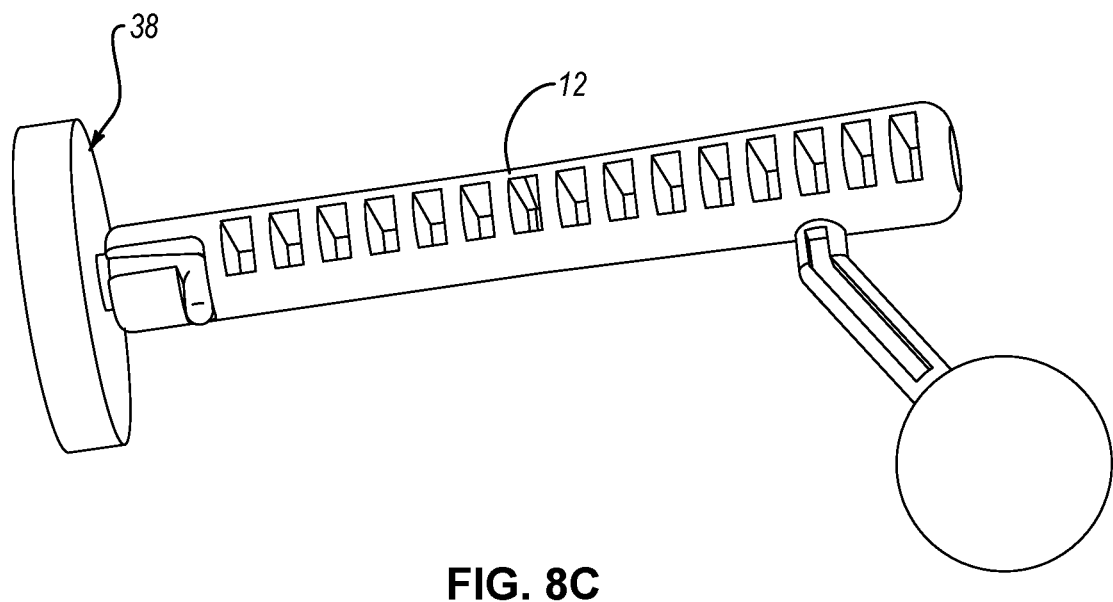
FIG. 8C is a photograph of an embodiment of a tamper accessory connected to a scoop, according to the present disclosure.

FIG. 8C illustrates an embodiment of a tamper accessory 38 connected to a bolt action scoop 12. Once attached, the scoop 12 acts as an extension or handle of the tamper accessory 28. In this way, the user does not need a separate tamper tool in addition to the scoop 12. Rather, the tamper accessory 38 can be added to the functionality of the scoop 12 for convenient and easy use.

Figure 9A:
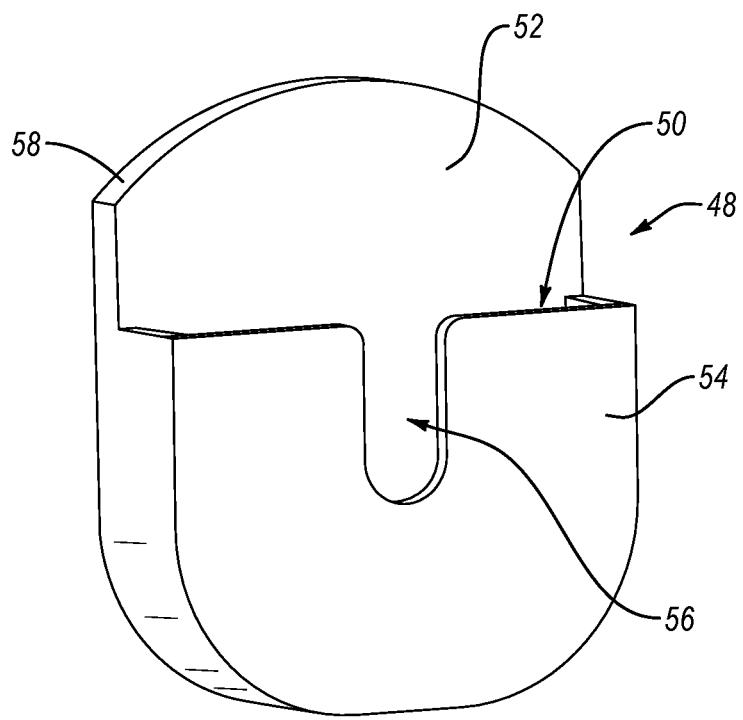
FIG. 9A illustrates an embodiment of a tamper rack, according to the present disclosure.

FIG. 9A illustrates an embodiment of a tamper rack 48, which is configured to store the tamper accessory 38 when not in use. In at least one embodiment, the tamper rack 48 includes a pocket 50 formed between a back plate 52 and a front plate 54. The front plate is separated at a distance from the back plate 52 to form a space therebetween, including the pocket 50. The pocket 50 is dimensioned such that it can receive the circular plate 44 of the tamper accessory 38.

Figure 9B:
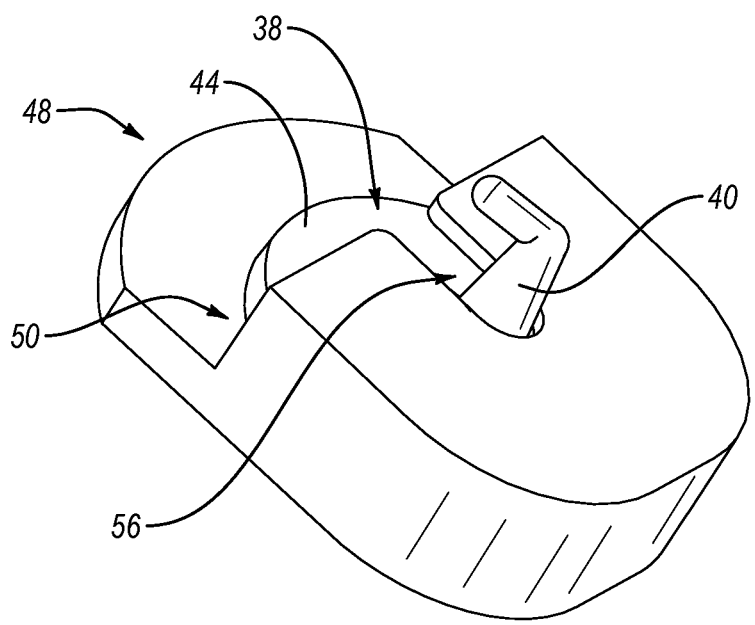
FIG. 9B is a photograph of a tamper accessory inserted into a tamper rack, according to the present disclosure.

In addition, the front plate 54 includes a notch 56 configured to receive the post 40 of the tamper accessory 38 when the circular plate 44 is disposed within the pocket 50. For example, FIG. 9B illustrates the tamper accessory 38 inserted into the tamper rack 48 when the tamper accessory 38 is not in use. As shown, the post 40 of the tamper accessory 38 protrudes out of the notch 56 so the circular plate 44 of the tamper accessory 38 can be fully inserted into the pocket 50 during storage.

In addition, referring to FIG. 9A, the tamper rack 48 may also include an attachment mechanism for securing the tamper rack 48 in place on a surface. For example, in at least one embodiment, the tamper rack 48 includes a magnet 58 secured to the back side of the back plate 52 of the tamper rack 48. The magnet 58 is configured to hold the tamper rack 48 onto a ferrous metal surface, such as a fridge or other kitchen appliance. In this way, the tamper accessory 48 may be conveniently placed within the kitchen or other room for easy access and retrieval.

In addition to the tamper accessory 38 described herein, one or more other accessories may also be configured to selectively connect to the accessory channel 28 of the scoop 12. In this way, the scoop 12 may be configured for use with multiple accessories and be used for various purposes. For example, in at least one embodiment, the coffee scoop system of the present disclosure includes a cleaner accessory 60.

Figure 10A:
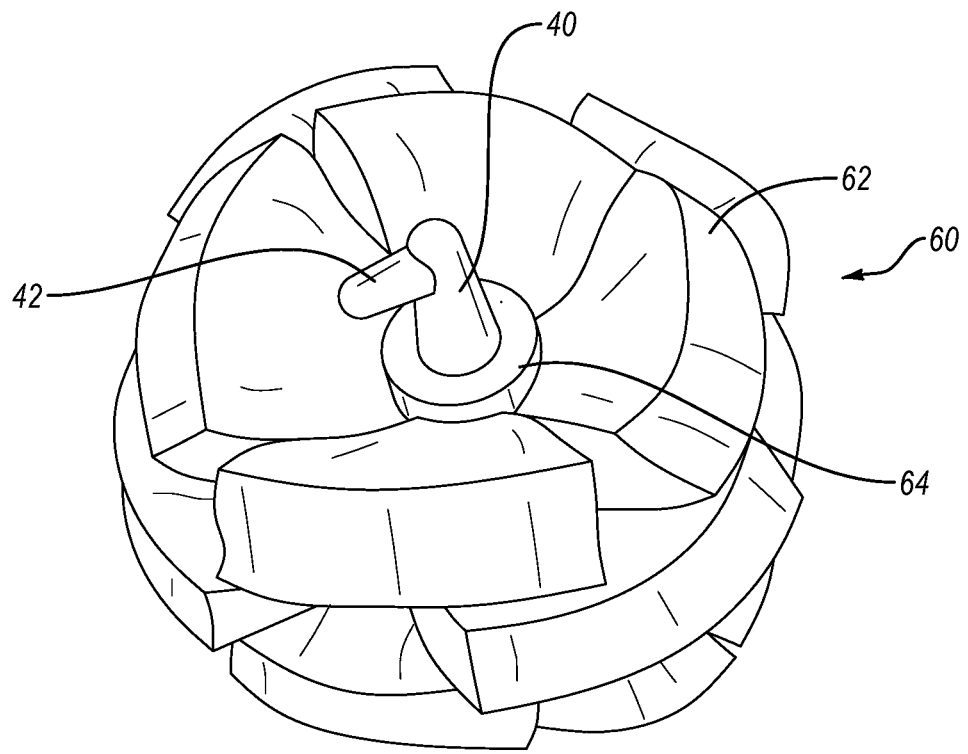
FIG. 10A is a photograph of an embodiment of a cleaner accessory, according to the present disclosure.

In at least one embodiment, as shown in FIG. 10A, the cleaner accessory 60 includes a sponge 62 secured to a cleaner core 64. The cleaner core 64 includes a post 40 and post extension 42, similar to other accessories described herein, for attachment to the scoop 12 via the accessory channel 28. In at least one embodiment, the cleaner accessory 60 may include materials other than sponge materials 62 connected to the cleaner core 64. For example, in at least one embodiment, bristles, brush hairs, scrubbers, rags, or other materials and cleaner configurations may be attached to the cleaner core 64.

Figure 10B:
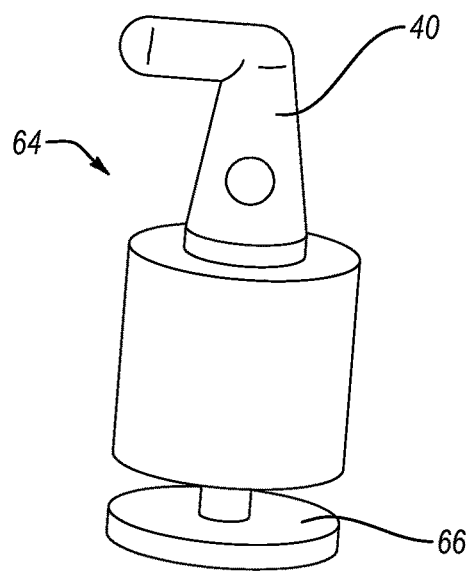
FIG. 10B illustrates an embodiment of a cleaner accessory core, according to the present disclosure.

FIG. 10B illustrates an embodiment of a cleaner core 64 used to secure the cleaner material, such as the sponge 62, to the post 40. The core 64 includes a slot 66 into which cleaner material, such as the sponge 62 or other materials and configurations noted above, can be pressed into, threaded around, or otherwise fitted to the core 64. In this way, the post 40 and post extension 42 extend from the cleaner accessory 60 for selective attachment to the scoop 12, similar to the attachment described between the tamper accessory 38 and scoop 12.

Figure 10C:
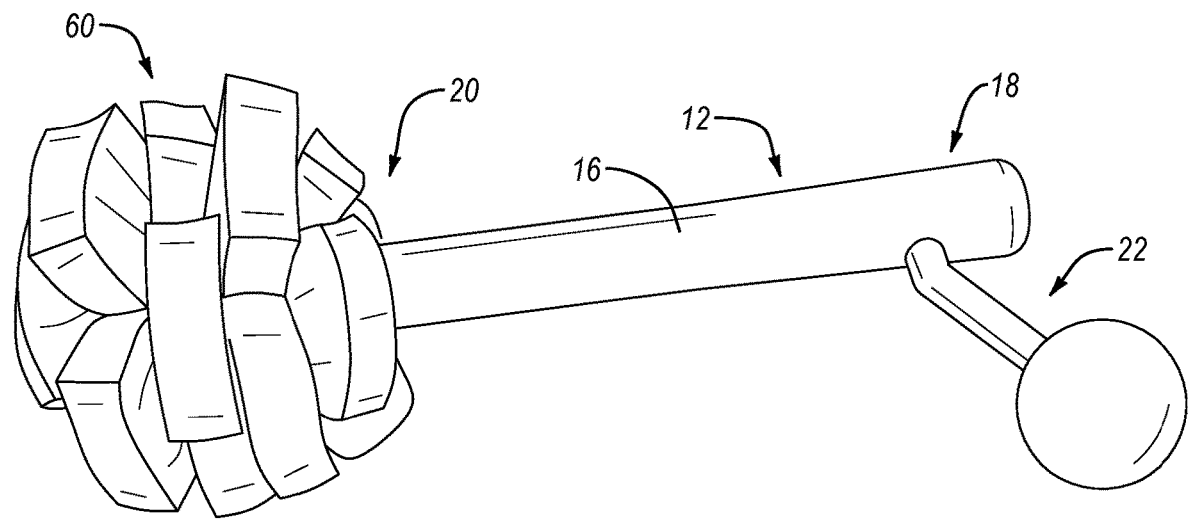
FIG. 10C is a photograph of an embodiment of a cleaner accessory connected to a bolt action scoop, according to the present disclosure.

Along these lines, FIG. 10C illustrates an embodiment of a cleaner accessory 60 connected to a scoop 12. As shown, the cleaner accessory 60 extends from the second end 20 of the bolt 16. In this way, the first end 18 of the bolt 16 and/or handle 22 of the scoop 12 may be conveniently grasped for scrubbing and utilizing the cleaner accessory 60.

Again, one or more other accessories may likewise be secured to the second end 20 of the bolt 16 via the accessory channel 28 for use with the scoop 12. In this way, the scoop 12 is adaptable and changeable to perform a multitude of different functions, depending on the accessory being used by a user. Thus, the user does not need to purchase or handle multiple different tools for tampering and cleaning. Rather, the user may use the same scoop 12 and various accessories that can be attached thereto to perform the various functions required for coffee preparation.

Figure 11:
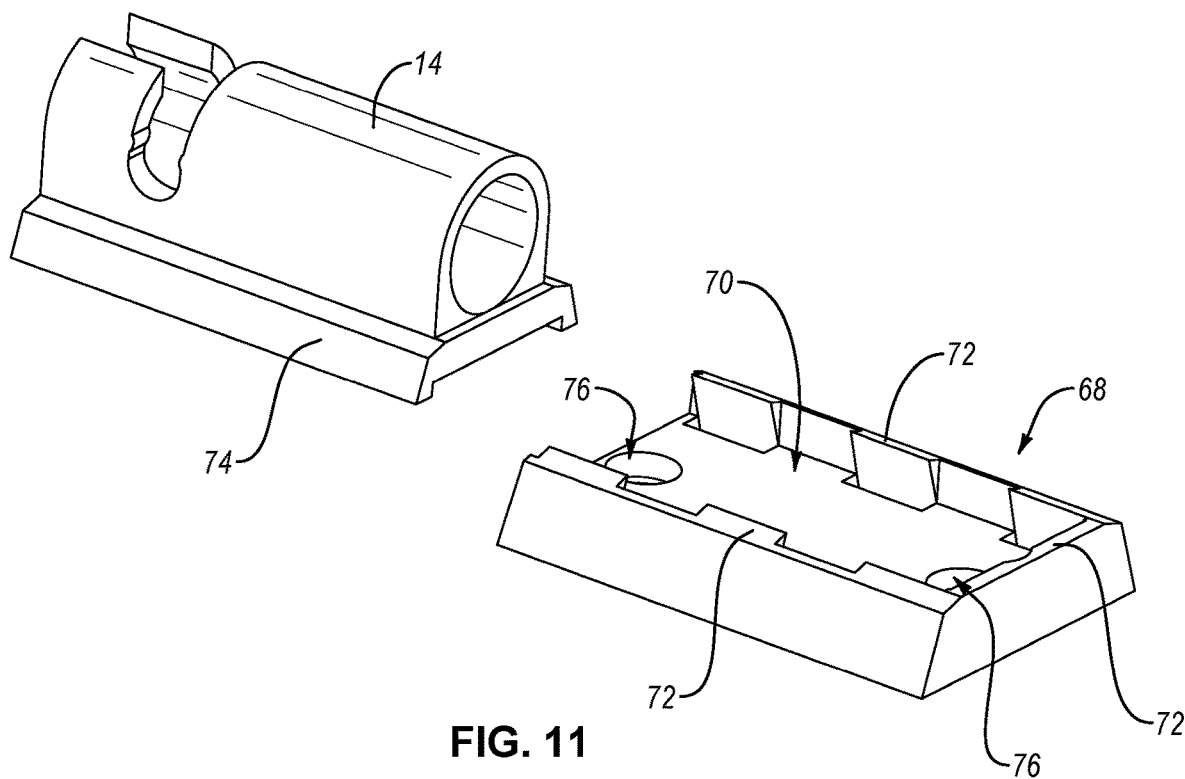
FIG. 11 illustrates an embodiment of a bolt chamber and bolt chamber rack, according to the present disclosure.

Similar to the tamper rack 48, the chamber 14 may include a magnet configured to removably secure the chamber 14 to a surface for convenient storage and access. Other embodiments may include other mechanisms for storing or placing the chamber 14 onto various surfaces. For example, as shown in FIG. 11, at least one embodiment of the present disclosure includes a chamber rack 68 with which the chamber 14 may slidably engage.

For example, in at least one embodiment, the chamber rack 68 includes a recessed portion 70 having angled sidewalls 72 that extend over a base portion 74 of the chamber 14 when the base portion 74 is slidably inserted into the recessed portion 70 of the chamber rack 68. In this way, the chamber rack 68 may be placed onto a surface and the chamber 14 is removably secured to that surface via the chamber rack 68.

In at least one embodiment, the chamber rack 68 may include a magnet on a back surface thereof to attach the chamber rack 68 to a ferrous metal surface. In at least one embodiment, the chamber rack 68 may be permanently secured to a surface, such as a wood surface or other non-ferrous metal surface, via screws or bolts passing through one or more screw-holes 76 disposed through the chamber rack 68. One will appreciate that any number of attachment means may be employed to removably or permanently secure the chamber rack 68 to a surface so that the chamber 14 may be removably secured to that surface via the chamber rack 68. Additionally, or alternatively, the chamber rack 68 may include a friction enhancing surface. In at least one embodiment, the friction enhancing surface may comprise a rubber material that increases friction between the chamber rack 68 and the surface or structure to which the chamber rack 68 is secured.

Figure 12:
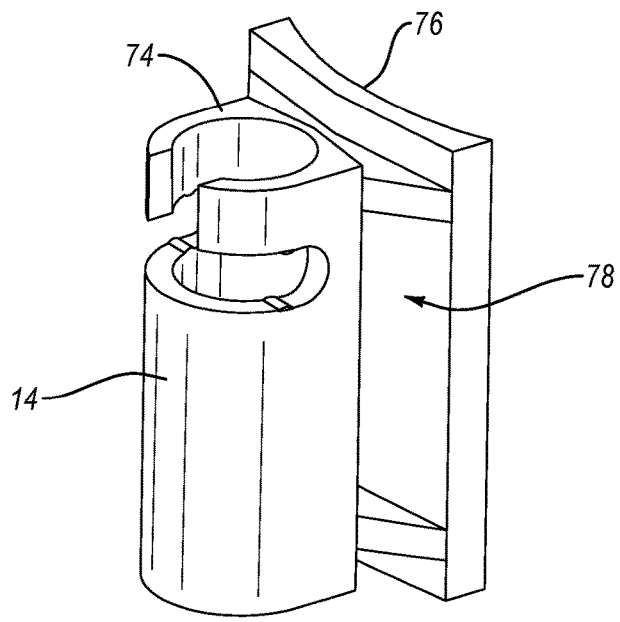
FIG. 12 illustrates an embodiment of a bolt chamber, according to the present disclosure.

Additionally, or alternatively, the chamber 14 may include other features and connection mechanisms to secure the chamber 14 to any number of surfaces or structures. For example, as shown in FIG. 12, at least one embodiment of a chamber 14 includes a base portion 74 having a curvilinear surface 76 configured to mate with a curvilinear structure or surface such as a coffee can or jar. In some embodiments, the curvilinear surface 76 may include a friction enhancing surface. In at least one embodiment, the friction enhancing surface may comprise a rubber material that increases friction between the base portion 74 of the chamber 14 and the surface or structure to which the chamber 14 is secured. In addition, in at least one embodiment, the base portion 74 includes a passageway 78 through which a strap may pass to secure the chamber 14 to a coffee can or jar.

Figure 13:
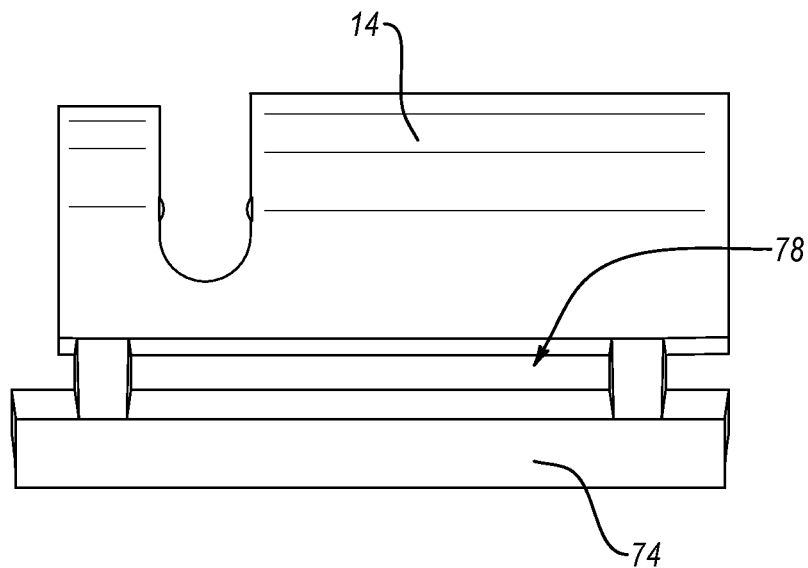
FIG. 13 illustrates an embodiment of a bolt chamber, according to the present disclosure.

In the illustrated embodiment, the passageway 78 may extend partially along the length of the base portion 74 to accommodate a strap passing therethrough. In at least one embodiment, as illustrated in FIG. 13, the passageway 78 may extend more substantially along the length of the base portion 74. In at least one embodiment, the base portion 74 of the chamber 14 includes a flat surface, rather than a curvilinear surface, and a passageway 78 extending therethrough. Such embodiments may be configured to be secured to flat surfaces or structures, such as boards, beams, or the like.

Figure 14:
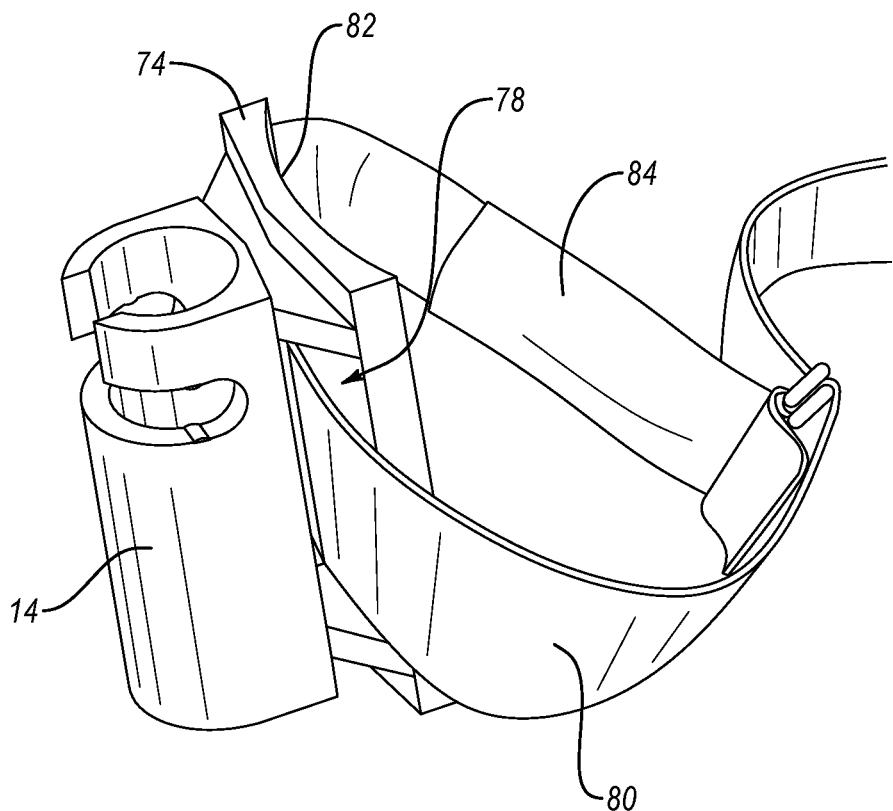
FIG. 14 is a photograph of an embodiment of a bolt chamber, according to the present disclosure.

Along these lines, FIG. 14 illustrates an embodiment of a chamber 14 having a base portion 74 with a passageway 78 extending therethrough. FIG. 14 also shows a strap 80 threaded through the passageway 78 and forming a loop. The strap 80 may be adjusted to change the size of the loop and secure the chamber 14 around a coffee can or jar or other structure (e.g., post, pole, etc.). Additionally, or alternatively, the base portion 74 may include a friction enhancing surface 82. In at least one embodiment, the friction enhancing surface 82 comprises a rubber material that increases friction between the base portion 74 of the chamber 14 and the surface or structure to which the chamber 14 is secured via the strap 80.

In addition, in at least one embodiment, the strap 80 also includes one or more friction enhancing features. For example, in at least one embodiment, the strap 80 includes a friction enhancing portion 84 disposed around a section of the strap 80 to enhance friction between the strap 80 and the structure or surface to which the chamber 14 is secured via the strap 80.

In at least one embodiment, the friction enhancing portion 84 of the strap 80 extends only partially around the loop formed by the strap 80. In at least one embodiment, the friction enhancing portion 84 extends entirely around the loop of the strap 80. In at least one embodiment, the friction enhancing portion 84 of the strap 80 includes rubber or other high-friction material. In at least one embodiment, the friction enhancing portion 84 of the strap 80 may be adjustable and repositionable along the strap 80.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. While certain implementations and details have been included herein and in the attached invention disclosure for purposes of illustrating the invention, it will be apparent to those skilled in the art that various changes in the methods and apparatus disclosed herein may be made without departing from the scope of the invention, which is defined in the appended claims. All changes which come within the meaning and range of equivalency of the claims are to be embraced within their scope.

I claim:

1. A coffee scoop system, comprising:
   a scoop, comprising:
      a bolt; and
      a handle extending from the bolt; and
   a chamber configured to receive the bolt of the scoop for selective securement of the scoop within the chamber, wherein the chamber comprises:
      a passage extending through the chamber into which the bolt is inserted during use;
      a bolt-action channel into which the handle of the scoop is inserted for selective securement of the scoop within the chamber.

2. The coffee scoop system of claim 1, wherein the bolt-action channel further comprises:
   a first channel portion extending longitudinally along the chamber; and
   a second channel portion extending perpendicular to the first channel portion.

3. The coffee scoop system of claim 1, wherein the handle comprises:
   an arm extending from the bolt; and
   a spoon disposed at an end of the arm.

4. The coffee scoop system of claim 3, the arm comprising:
   a first portion extending perpendicularly away from the bolt; and
   a second portion extending at an angle between the first portion and the spoon.

5. The coffee scoop system of claim 1, the bolt further comprising:
a first end;
a second end; and
an accessory channel disposed at the second end;
wherein the handle of the scoop extends from the bolt at or near the first end.

6. The coffee scoop system of claim 5, further comprising one or more accessories configured to connect to the bolt of the scoop via the accessory channel.

7. The coffee scoop system of claim 6, wherein the one or more accessories each include a post and a post extension, each of the posts and post extensions configured to engage the accessory channel of the bolt to removably connect each accessory to the bolt.

8. The coffee scoop system of claim 6, the one or more accessories comprising a tamper accessory having a circular plate.

9. The coffee scoop system of claim 6, the one or more accessories comprising a cleaner accessory.

10. A coffee scoop kit, the kit comprising:
a scoop comprising:
a bolt;
an arm extending from a bolt; and
a spoon disposed at an end of the arm opposite the bolt; and
a chamber comprising:
a passage through which the bolt can be inserted during use; and
a bolt-action channel into which the arm of the scoop is inserted to removably secure the scoop within the chamber during use.

11. The coffee scoop kit of claim 10, further comprising a cleaner accessory.

12. The coffee scoop kit of claim 10, further comprising a strap configured to secure the chamber to a structure.

13. The coffee scoop kit of claim 10, further comprising a chamber rack configured to removably secure the chamber to a surface or structure.

14. The coffee scoop kit of claim 10, further comprising a tamper accessory.

15. The coffee scoop kit of claim 14, further comprising a tamper rack configured to store the tamper accessory when the tamper accessory is not in use.

16. A coffee scoop system, comprising:
a scoop, comprising:
a bolt; and
a handle extending from the bolt, the handle comprising a spoon; and
a chamber configured to receive the bolt of the scoop for selective securement of the scoop within the chamber, the chamber comprising:
a base portion having a passageway extending therethrough; and
a strap configured to thread through the passageway and form a loop,
wherein the strap is configured to secure the chamber to a structure during use.

17. The coffee scoop system of claim 16, the base portion of the chamber further comprising a friction enhancing surface disposed on a back-side thereof.

18. The coffee scoop system of claim 16, the strap further comprising a friction enhancing portion disposed about at least a portion of the strap.

19. The coffee scoop system of claim 16, the chamber further comprising a bolt-action channel into which the handle of the scoop is inserted to removably secure the scoop within the chamber.

20. The coffee scoop system of claim 16, the bolt of the scoop comprising an accessory channel configured to receive one or more accessories and removably secure the one or more accessories to the bolt.

* * * * *